(12) United States Patent
Yi et al.

(10) Patent No.: US 10,433,206 B2
(45) Date of Patent: *Oct. 1, 2019

(54) METHOD FOR PROCESSING RADIO PROTOCOL IN MOBILE TELECOMMUNICATIONS SYSTEM AND TRANSMITTER OF MOBILE TELECOMMUNICATIONS

(71) Applicant: LG ELECTRONICS INC., Seoul (KR)

(72) Inventors: Seung-June Yi, Gyeonggi-do (KR); Young-Dae Lee, Gyeonggi-do (KR); Sung-Duck Chun, Gyeonggi-do (KR); Sung-Jun Park, Gyeonggi-do (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/262,457

(22) Filed: Jan. 30, 2019

(65) Prior Publication Data

US 2019/0174352 A1 Jun. 6, 2019

Related U.S. Application Data

(63) Continuation of application No. 15/648,995, filed on Jul. 13, 2017, now Pat. No. 10,244,430, which is a
(Continued)

(30) Foreign Application Priority Data

Mar. 6, 2008 (KR) .................. 10-2008-0021112

(51) Int. Cl.
*H04W 28/06* (2009.01)
*H04L 29/08* (2006.01)
(Continued)

(52) U.S. Cl.
CPC ....... *H04W 28/065* (2013.01); *H04L 29/0653* (2013.01); *H04L 49/90* (2013.01);
(Continued)

(58) Field of Classification Search
CPC . H04W 28/065; H04W 12/02; H04W 36/023; H04W 36/00; H04W 80/02;
(Continued)

(56) References Cited

U.S. PATENT DOCUMENTS 10,244,430 B2 3/2019 Yi et al.
2003/0008653 A1 1/2003 Jiang
(Continued)

FOREIGN PATENT DOCUMENTS

CN 1380804 11/2002
EP 1168759 1/2002
(Continued)

OTHER PUBLICATIONS

Universal Mobile Telecommunications System (UMTS); MAC protocol specification (3G TS 25.323 version 3.0.0 Release 1999) (Year: 2000).*
(Continued)

*Primary Examiner* — Thai Nguyen
(74) *Attorney, Agent, or Firm* — Lee Hong Degerman King Waimey

(57) ABSTRACT

An apparatus and method for performing procedures (protocols) of a PDCP (Packet Data Convergence Protocol) layer and an RLC (radio layer in an E-UMTS (Evolved Universal Mobile Telecommunications System) which has evolved from UMTS, among radio protocols of a mobile communication system. The PDCP layer performs ciphering on data (i.e., PDCP SDU) received from an upper layer, generates an indicator discriminating ciphered data and non-ciphered data (i.e., an ROHC feedback packet directly generated by
(Continued)

the PDCP layer), and transmits the same to a lower layer (i.e., MAC layer). A PDCP SN (Sequence Number) is defined as an algorithm for ciphering the data in the PDCP layer to perform ciphering in the PDCP layer.

12 Claims, 3 Drawing Sheets

Related U.S. Application Data continuation of application No. 15/410,473, filed on Jan. 19, 2017, now Pat. No. 9,730,104, which is a continuation of application No. 14/550,500, filed on Nov. 21, 2014, now Pat. No. 9,585,061, which is a continuation of application No. 13/962,674, filed on Aug. 8, 2013, now Pat. No. 8,929,298, which is a continuation of application No. 12/532,137, filed as application No. PCT/KR2008/001523 on Mar. 18, 2008, now Pat. No. 8,547,900.

(60) Provisional application No. 60/896,474, filed on Mar. 22, 2007, provisional application No. 60/895,720, filed on Mar. 19, 2007.

(51) Int. Cl.
| | | |
|---|---|---|
| *H04L 29/06* | (2006.01) | |
| *H04W 36/00* | (2009.01) | |
| *H04W 36/02* | (2009.01) | |
| *H04L 12/861* | (2013.01) | |
| *H04W 12/02* | (2009.01) | |
| *H04W 80/02* | (2009.01) | |

(52) U.S. Cl.
CPC .............. *H04L 69/08* (2013.01); *H04L 69/22* (2013.01); *H04L 69/324* (2013.01); *H04W 12/02* (2013.01); *H04W 36/00* (2013.01); *H04W 36/023* (2013.01); *H04W 80/02* (2013.01)

(58) Field of Classification Search
CPC ..... H04L 29/0653; H04L 49/90; H04L 69/08; H04L 69/22; H04L 69/324
See application file for complete search history.

(56) References Cited

U.S. PATENT DOCUMENTS

| | | |
|---|---|---|
| 2003/0147396 A1 | 8/2003 | Jiang |
| 2005/0282521 A1 | 12/2005 | Hermann et al. |
| 2007/0041382 A1* | 2/2007 | Vayanos ............. H04L 63/0428 370/394 |
| 2007/0248075 A1 | 10/2007 | Liu et al. |
| 2007/0258591 A1 | 11/2007 | Terry et al. |
| 2008/0080516 A1* | 4/2008 | Sammour ............... H04L 1/165 370/394 |
| 2009/0316664 A1 | 12/2009 | Wu |
| 2010/0091709 A1 | 4/2010 | Yi et al. |
| 2013/0322464 A1 | 12/2013 | Yi et al. |
| 2015/0103803 A1 | 4/2015 | Yi et al. |
| 2017/0134982 A1 | 5/2017 | Yi et al. |
| 2017/0318496 A1 | 11/2017 | Yi et al. |

FOREIGN PATENT DOCUMENTS

| | | |
|---|---|---|
| EP | 1326388 | 6/2010 |
| JP | 10066157 | 3/1998 |
| JP | 2002199050 | 7/2002 |
| JP | 2003-018168 | 1/2003 |
| JP | 2003111148 | 4/2003 |
| JP | 2003-523137 | 7/2003 |
| JP | 2006203265 | 8/2006 |
| JP | 2006-339988 | 12/2006 |
| JP | 2008-539678 | 11/2008 |
| JP | 2015202022 | 11/2015 |
| JP | 6002829 | 10/2016 |
| KR | 10-2005-0073353 | 7/2005 |
| KR | 10-2007-0024427 | 3/2007 |
| RU | 2204215 | 5/2003 |
| TW | I268689 | 12/2006 |
| TW | I271081 | 1/2007 |
| WO | 2005046086 | 5/2005 |
| WO | 2006/043746 | 4/2006 |
| WO | 2006/102821 | 10/2006 |
| WO | 2006104344 | 10/2006 |
| WO | 2006116620 | 11/2006 |
| WO | 2006118435 | 11/2006 |

OTHER PUBLICATIONS

Universal Mobile Telecommunications System (UMTS); Radio Link Control (RLC) protocol specification (3GPP TS 25.322 version 7.2.0 Release 7) (Year: 2006).*
Network Working Group Request for Comments: 3095, Jul. 2001 (Year: 2001).*
ASUSTeK, "Using RTP SN for PDCP SN in LTE," 3GPP TSG RAN WG2 #57, R2-070763, Feb. 2007, 3 pages.
3rd Generation Partnership Project (3GPP), "Technical Specification Group Radio Access Network; Evolved Universal Terrestrial Radio Access (E-UTRA) and Evolved Universal Terrestrial Radio Access Network (E-UTRAN); Radio Interface protocol aspects (Release 7)," 3GPP TR 25.813 V7.1.0, Sep. 2006, 41 pages.
NTT DoCoMo, "PDCP SN Length for LTE (for SA3 LS response)," 3GPP TSG RAN WG2 Meeting #55, R2-062909, Oct. 2006, 2 pages.
NTT DoCoMo, et al., "L2 Framing for LTE," 3GPP TSG RAN WG2 Meeting #55, R2-062905, Oct. 2006, 4 pages.
European Patent Office Application Serial No. 08723560.2, Search Report dated Oct. 31, 2014, 8 pages.
Samsung, "Re-use of PDCP SN at ARQ level?," 3GPP TSG-RAN2 Meeting #53bis, Tdoc R2-061829, Jun. 2006, 9 pages.
Ericsson et al., "DL re-ordering and forwarding," 3GPP TSG-RAN WG2 #56bis, Tdoc R2-070250, Jan. 2007, 4 pages.
Network Working Group, "Robust Header Compression (ROHC)", RFC 3095, Jul. 2001, 41 pages (relevant sections: 4.4.3; and 5.5.1.1).
3rd Generation Partnership Project (3GPP), "Universal Mobile Telecommunications System (UMTS); Packet Data Convergence Protocol (PDCP) Specification (3G TS 25.323 version 3.1.0 Release 1999)," ETSI TS 125 323 V3.1.0, Mar. 2000, 17 pages (relevant section: 5).
3rd Generation Partnership Project (3GPP), "Universal Mobile Telecommunications System (UMTS); Radio Link Control (RLC) protocol specification, (3GPP TS 25.322 version 7.2.0 Release 7)," ETSI TS 125 322 V7.2.0, Sep. 2006, 88 pages (relevant pp. 13-16).
Taiwan Intellectual Property Office Application Serial No. 097109710, Office Action dated May 17, 2013, 10 pages.
LG Electronics Inc., "L2 architecture for LTE," 3GPP TSG-RAN WG2 #57bis, R2-071491, Mar. 2007, 4 pages.
LG Electronics Inc., "PDCP spec skeleton," 3GPP TSG RAN WG2 #58, R2-071679, May 2007, 13 pages.
LG Electronics Inc., "PDCP Sequence Number and ROHCv2," 3GPP TSG-RAN WG2 #58, R2-071849, May 2007, 2 pages.
3rd Generation Partnership Project (3GPP), Universal Mobile Telecommunications System (UMTS); MAC protocol specification (3G TS 25.323 version 3.0.0 Release 1999), ETSI TS 125 323 V3.0.0, Jan. 2000, 17 pages.
3rd Generation Partnership Project (3GPP), Universal Mobile Telecommunications System (UMTS); Radio Link Control (RLC) protocol specification (3GPP TS 25.322 version 7.2.0 Release 7), ETSI TS 125 322 V7.2.0, Sep. 2006, 88 pages.
Bormann, et al., "Robust Header Compression (ROHC): Framework and four profiles: RTP, UDP, ESP, and uncompressed,"

(56) References Cited

OTHER PUBLICATIONS

Network Working Group, Request for Comments: 3095, Category: Standards Track, Jul. 2001, 169 pages.
Samsung, "Selective forwarding/retransmission during HO," 3GPP TSG-RAN2 Meeting #56bis, Tdoc R2-070130, Jan. 2007, 5 pages.
NTT DoCoMo, Inc., "RLC sequence numbering for LTE," 3GPP TSG RAN WG2 Ad Hoc on LTE, R2-061977, Jun. 2006, 2 pages.
Samsung, "Sequence Number handling in LTE", 3GPP TSG RAN WG2 Meeting #52, R2-060938, May 2006, 4 pages.
Intellectual Property Office of India Application Serial No. 5374/CHENP/2009, Office Action dated Feb. 26, 2015, 2 pages.
NEC, "User Plane handling during inter-eNB HO", R2-071973, 3GPP TSG-RAN WG2# 58 Meeting, May 2007, 3 pages.
NTT DoCoMo, Inc., "Proposals on data handling at handover", R2-072063, 3GPP TSG RAN WG2 #58, May 2007, 3 pages.
Lee, et al., "Extended-rtPS Algorithm for VoIP Services in IEEE 802.16 systems," IEEE International Conference on Communications, vol. 5, 2006, pp. 2060-2065.
Universal Mobile Telecommunications System (UMTS) Packet Data Convergence Protocol (PDCP) Specification (3GPP TS 25.323 version 7.3.0 Release 7).

\* cited by examiner

[Fig. 1]
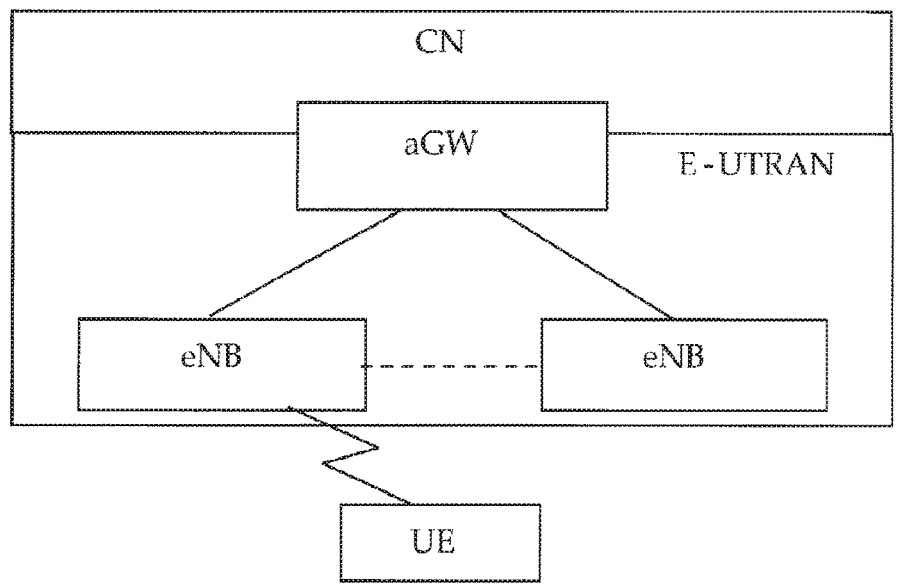
[Fig. 2]
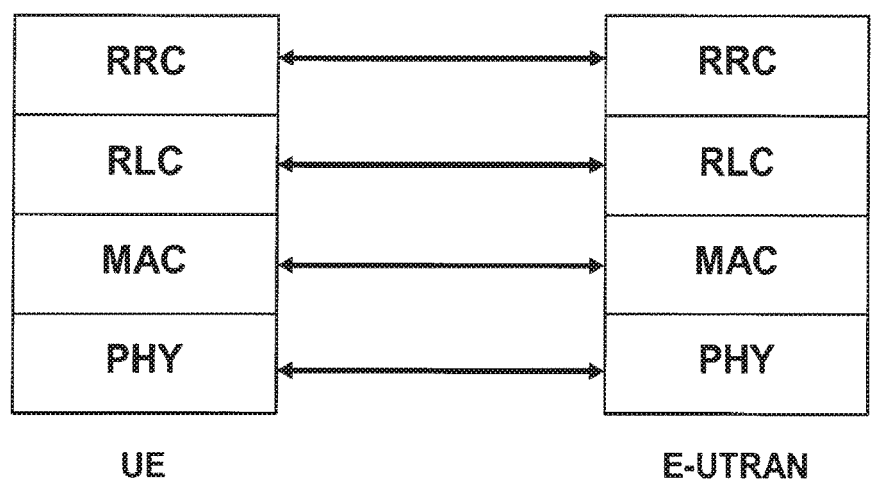
[Fig. 3]
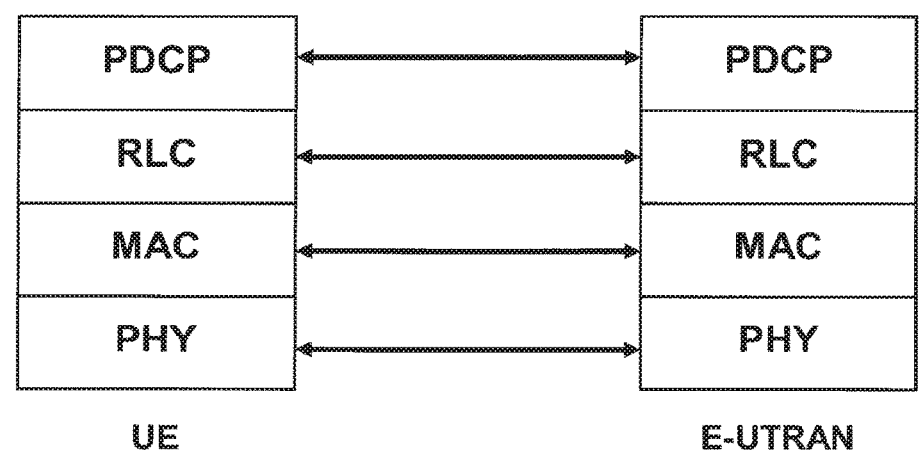

[Fig. 4]
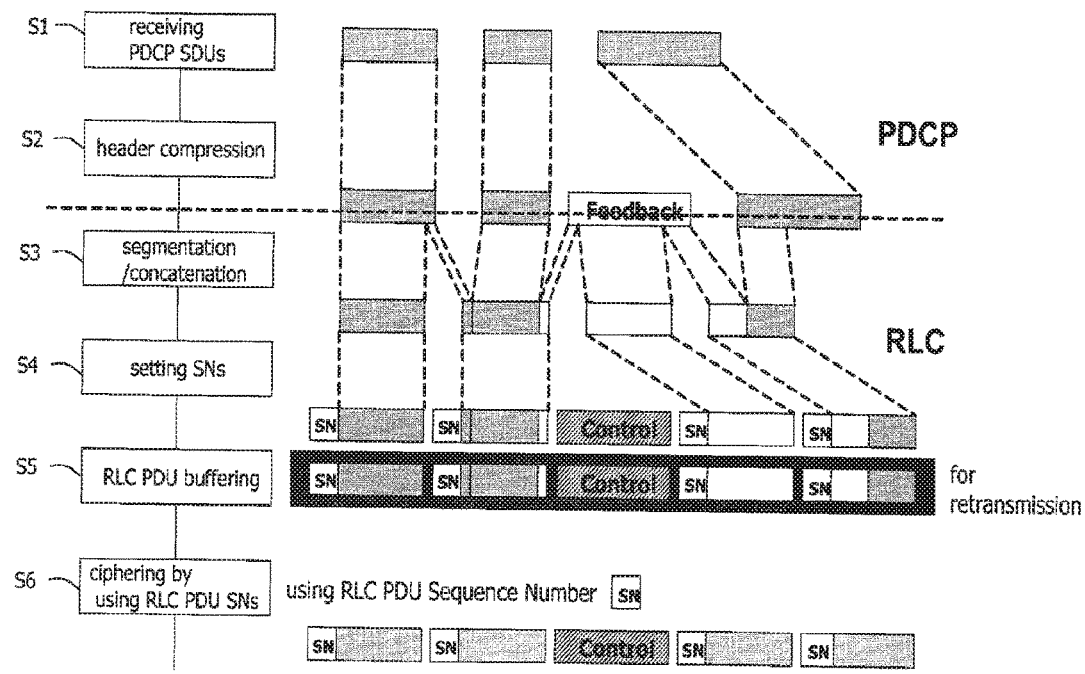
[Fig. 5]
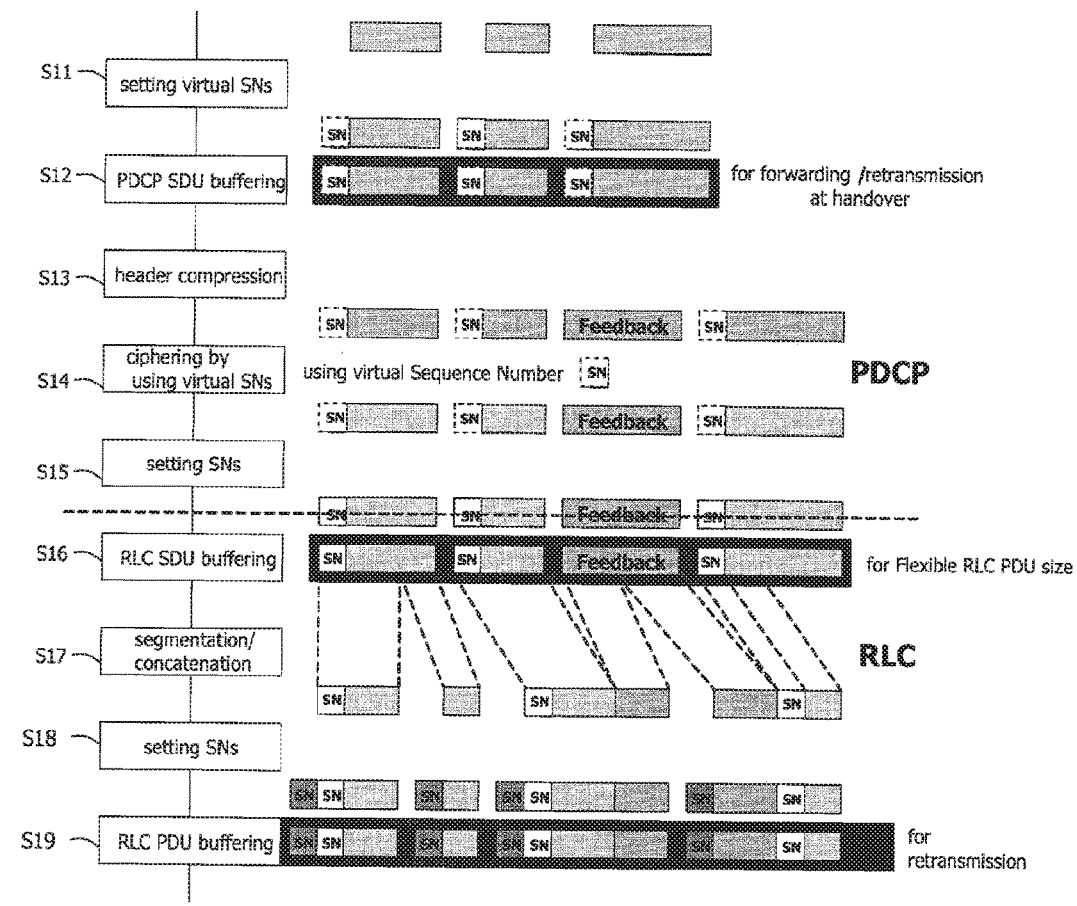

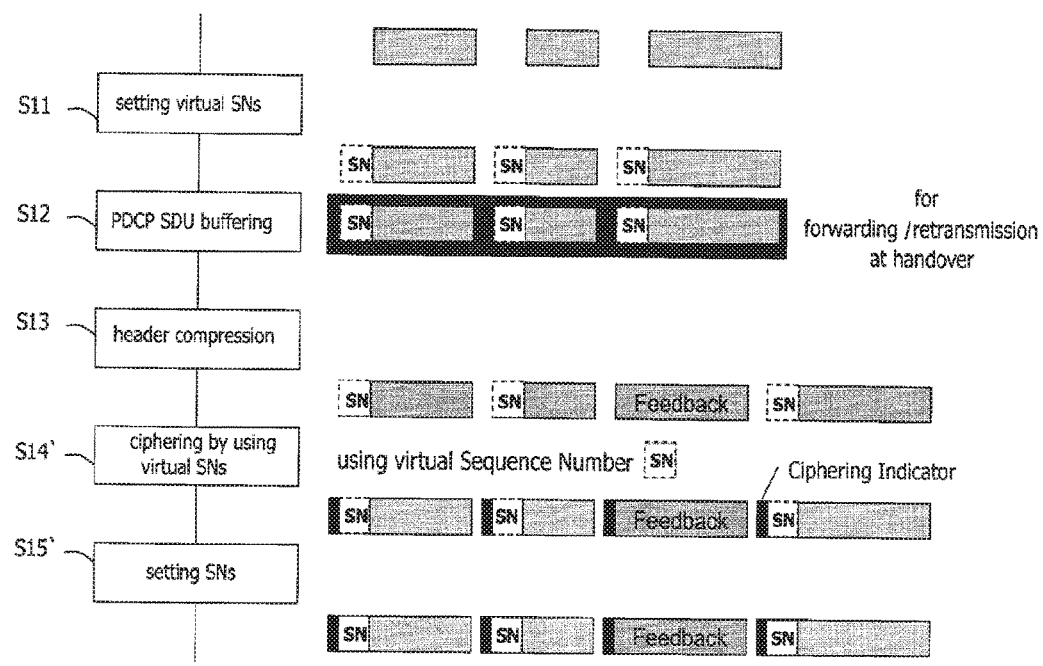

METHOD FOR PROCESSING RADIO PROTOCOL IN MOBILE TELECOMMUNICATIONS SYSTEM AND TRANSMITTER OF MOBILE TELECOMMUNICATIONS

CROSS-REFERENCE TO RELATED APPLICATIONS

This application is a continuation of U.S. patent application Ser. No. 15/648,995, filed on Jul. 13, 2017, now U.S. Pat. No. 10,244,430, which is a continuation of U.S. patent application Ser. No. 15/410,473, filed on Jan. 19, 2017, now U.S. Pat. No. 9,730,104, which is a continuation of U.S. patent application Ser. No. 14/550,500, filed on Nov. 21, 2014, now U.S. Pat. No. 9,585,061, which is a continuation of U.S. patent application Ser. No. 13/962,674, filed on Aug. 8, 2013, now U.S. Pat. No. 8,929,298, which is a continuation of U.S. patent application Ser. No. 12/532,137, filed on Sep. 18, 2009, now U.S. Pat. No. 8,547,900, which is the National Stage filing under 35 U.S.C. 371 of International Application No. PCT/KR2008/001523, filed on Mar. 18, 2008, which claims the benefit of earlier filing date and right of priority to Korean Application No. 10-2008-0021112, filed on Mar. 6, 2008, and also claims the benefit of U.S. Provisional Application No. 60/895,720, filed on Mar. 19, 2007, and 60/896,474, filed on Mar. 22, 2007, the contents of which are all hereby incorporated by reference herein in their entirety.

TECHNICAL FIELD

The present invention relates to a radio protocol of a mobile communication system and, more particular, to an apparatus and method for performing procedures (protocols) of a PDCP layer and an RLC (Radio Link Control) layer in an the E-UMTS (Evolved Universal Mobile Telecommunications System) which has evolved from UMTS.

BACKGROUND ART

FIG. 1 is a network structure of an LTE (Long Term Evolution) system, the related art mobile communication system. For the LIE system, which has evolved from the existing UMTS system, basic standardizations are ongoing in the 3GPP.

An LTE network can be divided into an E-UTRAN (Evolved UMTS Terrestrial Radio Access Network) and a CN (Core Network). The E-UTRAN includes a terminal (or UE (User Equipment)), a base station (eNB (Evolved NodeB), and an access gateway (aGW). The access gateway may be divided into a part that handles processing of user traffic and a part that handles control traffic. In this case, the access gateway part that processes the user traffic and the access gateway part that processes the control traffic may communicate with a new interface. One or more cells may exist in a single eNB. An interface may be used for transmitting user traffic or control traffic between eNBs. The CN may include the access gateway and a node or the like for user registration of the UE. An interface for discriminating the E-UTRAN and the CN may be used.

FIG. 2 shows an exemplary structure of a control plane of a radio interface protocol between the UE and the E-UTRAN based on the 3GPP radio access network standards. FIG. 3 shows an exemplary structure of a user plane of the radio interface protocol between the UE and the E-UTRAN based on the 3GPP radio access network standards.

The structure of the radio interface protocol between the UE and the E-UTRAN will now be described with reference to FIGS. 2 and 3.

The radio interface protocol has horizontal layers comprising a physical layer, a data link layer, and a network layer, and has vertical planes comprising a user plane (U-plane) for transmitting data information and a control plane (C-plane) for transmitting control signals. The protocol layers in FIGS. 2 and 3 can be categorized as a first layer (L1), a second layer (L2), and a third layer (L3) based on three lower layers of an open system interconnection (OSI) standard model widely known in the communication system. The radio protocol layers exist as pairs between the UE and the E-UTRAN and handle a data transmission in a radio interface.

The layers of the radio protocol control plane of FIG. 2 and those of the radio protocol user plane will be described as follows.

The physical layer, the first layer, provides an information transfer service to an upper layer by using a physical channel. The physical layer is connected to an upper layer called a medium access control (MAC) layer via a transport channel. Data is transferred between the MAC layer and the physical layer via the transport channel. The transport channel is divided into a dedicated transport channel and a common channel according to whether or not a channel is shared. Between different physical layers, namely, between a physical layer of a transmitting side and that of a receiving side, data is transferred via the physical channel.

The second layer includes various layers. First, a medium access control (MAC) layer serves to map various logical channels to various transport channels and performs logical channel multiplexing by mapping several logical channels to a single transport channel. The MAC layer is connected an upper layer called a radio link control (RLC) layer by a logical channel. The logical channel is divided into a control channel that transmits information of the control plane and a traffic channel that transmits information of the user plane according to a type of transmitted information.

An RLC (Radio Resource Control) layer, the second layer, segments or concatenates data received from an upper layer to adjust the data size so as for a lower layer to suitably transmit the data to a radio interface. In addition, in order to guarantee various QoSs required by each radio bearer RB, the RLC layer provides three operation modes: a TM (Transparent Mode); a UM (Unacknowledged Mode); and an AM (Acknowledged Mode). In particular, the RLC layer (referred to as an 'AM RLC layer', hereinafter) operating in the AM performs a retransmission function through an automatic repeat and request (ARQ) function for a reliable data transmission.

A packet data convergence protocol (PDCP) layer of the second layer performs a function called header compression that reduces the size of a header of an IP packet, which is relatively large and includes unnecessary control information, in order to effectively transmit the IP packet such as an IPv4 or IPv6 in a radio interface having a smaller bandwidth. The header compression increases a transmission efficiency between radio interfaces by allowing the head part of the data to transmit only the essential information.

The RRC layer located at the uppermost portion of the third layer is defined only in the control plane, and controls a logical channel, a transport channel and a physical channel in relation to configuration, reconfiguration, and the release or cancellation of radio bearers (RBs). In this case, the RBs refer to a logical path provided by the first and second layers of the radio protocol for data transmission between the UE and the UTRAN. In general, the set-up (configuration) of the RB refers to the process of stipulating the characteristics of a radio protocol layer and a channel required for providing a particular data service, and setting the respective detailed parameters and operation methods.

The respective radio protocol layers of the LTE are basically based on the radio protocol layers of the UMTS. As described above, the radio protocol layers of the UMTS have the substantially similar functions as those of the LIE. Here, a data processing method of the AM RLC and the PDCP layers, among the second layer, related to the present invention will be described in detail.

FIG. 4 illustrates the processing order in which a transmitting side of AM RLC and PDCP layers of a UMTS receives data from an upper layer, processes the received data, and transmits the processed data;

The order of processing the data received by the transmitting side of the AM RLC and the PDCP layers of the UMTS from the upper layer will now be described with reference to FIG. 4. An SDU (Service Data Unit) refers to data received from an upper layer, and PDU (Protocol Data Unit) refers to data which has been received from an upper layer, processed and then transmitted to a lower layer.

The PDCP layer receives data (PDCP SDU), which is to be transmitted to a lower layer, from an upper layer (S1). The PDCP layer compresses a header of the received data (PDCP SDU) and transfers the same to the lower RLC layer. In this case, a header compressor of the PDCP layer may generate a header-compressed feedback packet by itself irrespective of the PDCP SDU. The header-compressed PDCP SDU or the feedback packet includes PDCP PDUs which are transferred to the lower RLC layer (S2).

When the AM RLC layer receives the RLC SDU, namely, the PDCP PDUs, it segments or concatenates the PDCP PDUs in a fixed size. The AM RLC layer sequentially attaches an RLC sequence number (SN) to the segmented or concatenated data blocks (S4). In this case, the AM RLC layer may generate RLC control PDUs by itself irrespective of the RLC SDU. Here, the RLC SN is not added to the RLC control PDUs. In step S4 as shown in FIG. 4, the RLC PDUs include RLC SN-attached data blocks or RLC SN-free RLC control PDUs. The RLC PDUs are stored in an RLC PDU buffer (S5). This is for a re-transmission of the RLC PDUs that may be necessary later.

When the AM RLC layer transits or re-transmits the RLC PDUs, it performs ciphering by using the RLC PDU SN (S6). In this case, because the ciphering uses the SN, the SN-free RLC PDUs, namely, the RLC control PDUs, are not ciphered. The ciphered RLC PDUs or the non-ciphered RLC control PDUs are sequentially transferred to the lower MAC layer.

In the LIE, the L2 protocol has a room to be improved in various aspects. In particular, the PDCP layer and the AM RLC layer are expected to have the following, requirements.

First, in forwarding or re-transmitting unconfirmed PDCP SDUs at handover, the transmitting side forwards or re-transmits only SDUs that have not been received by a receiving side. This is called a selective forwarding or re-transmission.

Second, the size of the RLC PDUs is flexible according to a radio environment at each transmission.

Third, ciphering of the RLC PDU at every transmission or re-transmission is prevented.

These requirements cannot be satisfied by the related art UMTS L2 protocol, so designing of a new L2 protocol is required for the LTE.

DISCLOSURE OF INVENTION

Technical Solution

Therefore, it is an object of the present invention to design a new L2 protocol in the LTE in an effort to solve the technical problem of the related art UMTS L2 protocol.

Namely, the present invention has evolved from the UMTS and provides a new method of designing the structure of a second layer suitable for various requirements of a new system by supporting a selective re-transmission during handover, supporting a variable PDU size of an RLC, and reducing overhead in a ciphering process which is performed whenever an RLC PDU is transmitted.

Meanwhile, in forwarding or re-transmitting the unconfirmed PDCP SDUs during handover (namely, the PDCP SDUs have not been successfully received by the receiving side), in order to forward or re-transmit only the SDUs that have not been successfully received by the receiving side, the PDCP SN should be explicitly added to each PDCP SDU and transmitted, unlike in the related art in which the terminal and the network implicitly manage the PDCP SN. Namely, the PDCP SN is explicitly used like the RLC SN.

The use of the explicit PDCP SN allows the upper PDCP layer, not the RLC layer, to perform ciphering. Ciphering by the PDCP layer can be more advantageous in terms of protocol operations because it can prevent the RLC layer from ciphering the PDUs each time the PDU is forwarded or re-transmitted. In this case, the PDCP SDU received from an upper layer can be ciphered because the PDCP SN exists to correspond to each SDU. However, there is no PDCP SN for an ROHC feedback packet which is generated by the PDCP layer itself, so the ROHC feedback packet cannot be ciphered. Thus, it is necessary to check whether the valid data (payload) part of each PDCP PDU has been ciphered or not because, when the receiving side receives the PDCP PDUs, it should discriminate ciphered data (namely, the payload part of each PDU) and the non-ciphered data (namely, the ROHC feedback packet) and decipher only the ciphered data.

Thus, in the present invention, an indicator indicating whether the valid data (payload) part of each PDCP PDU has been ciphered or not is provided in the E-UMTS (Evolved Universal Mobile Telecommunications System). In addition, the indicator serves to discriminate a non-ciphered ROHC feedback packet (namely, the packet generated by the PDCP layer itself) and a ciphered valid data of a PDCP PDU. Accordingly, the receiving side can instruct to decipher only the ciphered valid data of a PDCP PDU.

To achieve the above object, there is provided a mobile communication transmitter including: a first SN (Sequence Number) setting module that receives data from an upper layer and sets a first SN associated with the data; a header compression module that compresses a header of the received data; a ciphering module that ciphers the header-compressed data; and a second SN setting module that adds a second SN to the ciphered data and transits the same to a lower layer.

Preferably, the header compression module adds an indicator to the data which has been ciphered by the ciphering module or adds an indicator to the data to which the second SN has been added by the second SN setting module.

Preferably, the mobile communication transmitter further includes a first buffer.

Preferably, the header compression module generates data by itself, separately from the data received from the upper layer.

Preferably, the data generated by the header compression module itself is not ciphered by the ciphering module.

Preferably, the data generated by the header compression module itself is feedback data which is unrelated to the data received from the upper layer.

Preferably, the data generated by the header compression module itself is an ROHC (Robust Header Compression) feedback packet.

Preferably, the mobile communication transmitter further includes: a second buffer that receives and stores the second SN-added data; a segmentation and concatenation module that segments and/or concatenates the data stored in the second buffer; a third SN setting module that adds a third SN to the segmented and/or concatenated data; and a third buffer that stores the data to which the third SN has been added by the third SN setting module.

Preferably, the second buffer is an RLC (Radio Link Control) SDU (Service Data Unit) buffer, and the third buffer is an RLC PDU (Protocol Data Unit) buffer.

Preferably, the third SN added by the third SN setting module is an RLC SN.

Preferably, the first buffer is a PDCP (Packet Data Convergence Protocol) SDU (Service Data Unit) buffer, and the lower layer is an RLC layer.

The present invention provides the structure and data processing method of the second layer of the radio protocol to satisfy the conditions required by the above-described LTE system.

In addition, in the present invention, the ciphering process, one of the essential functions of the LTE can be smoothly performed at the second layer.

BRIEF DESCRIPTION OF THE DRAWINGS

FIG. 1 is a network structure of an LTE (Long Term Evolution) system, the related art mobile communication system;

FIG. 2 shows an exemplary structure of a control plane of a radio interface protocol between a UE and an E-UTRAN based on the 3GPP radio access network standards;

FIG. 3 shows an exemplary structure of a user plane of the radio interface protocol between the UE and the E-UTRAN based on the 3GPP radio access network standards;

FIG. 4 illustrates the processing order in which a transmitting side of AM RLC and PDCP layers of a UMTS receives data from an upper layer, processes the received data, and transmits the processed data;

FIG. 5 illustrates the structure of an L2 protocol and the processing order in which the transmitting side processes data according to a first embodiment of the present invention; and FIG. 6 is a view showing the data structure including indicators indicating whether data has been ciphered or not and a data processing method of the PDCP transmitting side.

MODE FOR THE INVENTION

The present invention is applicable to an E-UMTS (Evolved Universal Mobile Telecommunications System) which has evolved from a UMTS. However, the present invention is not limited thereto and can be applicable to any communication system and any communication protocol to which the technical idea of the present invention can be applicable.

The basic concept of the present invention is to design and define a radio protocol and a data structure that can meet the above-described requirements. That is, in the present invention, first, a PDCP layer ciphers data (i.e., a PDCP SDU) received from an upper layer, generates an indicator for discriminating data that has been ciphered and data that has not been ciphered (i.e., the ROHC feedback packet directly generated by the PDCP layer), and transmits the ciphered data with the indicator to a lower layer (i.e., RLC layer). Second, the PDCP layer defines a PDCP SN according to an algorithm for ciphering the data, to perform ciphering.

The construction and operation of the present invention will now be described.

FIG. 5 illustrates the structure of an L2 protocol and the sequential data processing by a transmitting side according to a first embodiment of the present invention, FIG. 5 shows the sequential order in processing and transmitting data which has been received by the transmitting side of the RLC and PDCP layers in an LTE from an upper layer. Among the terms used in the present invention, an SDU refers to data received from an upper layer and PDU refers to data transmitted to a lower layer after being received from an upper layer and processed.

The first embodiment of the present invention will now be described with reference to FIG. 5.

S11: As shown in FIG. 5, the PDCP layer receives data (PDCP SDUs) to be transmitted to a lower layer, from an upper layer. The PDCP layer sets a virtual SN (Sequence Number) with respect to each PDCP SDU. In this case, the PDCP SDU SNs are sequentially set to discriminate the respective PDCP SDUs. The step S11 is performed by a first setting module. In S11, the SNs are not actually added to the PDCP SDUs but the respective PDCP SDUs are managed by sort of pointers (not shown) which are discriminated by each different SN. For this reason, the SNs are expressed as virtual SNs. Furthermore, this reason makes implicit expression in step S11 in FIG. 5 wherein each SN (i.e., virtual SN) of the PDCP SDUs is drawn by dotted lines.

S12: The PDCP layer stores the respective PDCP SDUs in a PDCP SDU buffer. This is for a source base station (i.e., source NodeB) to forward a PDCP SDU whose reception has been unconfirmed by a terminal (UE) to target base station (i.e., a target NodeB), or for the terminal to re-transmit a PDCP SDU whose reception has been unconfirmed (i.e., for example in case a source NodeB may be not confirmed for a target NodeB to successfully receive a PDCP SDU which has been transmitted from the source NodeB) by the source NodeB to the target NodeB during handover. When the PDCP SDUs are forwarded or re-transmitted during handover, only the PDCP SDUs that have not been properly received by the receiving side according to a status report of the RLC layer or the PDCP layer. This is called a selective forwarding/re-transmission. The step 12 is performed by the PDCP SDU buffer. The virtual SN setting process and the PDCP SDU buffering may be simultaneously performed. If the PDCP layer does not support the selective forwarding/retransmission, the PDCP SDU buffer may not be provided.

S13: A header compressor (or header compression module) sequentially performs header compression on the PDCP SDUs. In this case, the header compressor may generate a header compression feedback packet or a PDCP STATUS PDU, etc., which are unrelated to the PDCP SDUs, by itself.

S14: The PDCP layer sequentially ciphers the header-compressed PDCP SDUs. In this case, the PDCP layer performs ciphering by using virtual PDCP SNs which were set when the PDCP SDUs were stored in the buffer. Namely, the PDCP SNs act as input parameters in a ciphering algorithm to serve to generate each different ciphering mask for each SDU. The step S14 is performed by the ciphering module. Besides the ciphering operation, the PDCP layer may perform a security function including an integrity protection function. Also, in case of the integrity protection, the PDCP SDUs are integrity-protected by using virtual PDCP SNs. The PDCP layer may include packets generated by the PDCP layer itself, such as a feedback packet generated by the header compressor itself and the PDCP STATUS PDU, etc., generated by the PDCP layer itself. The feedback packet or the PDCP STATUS PDU, etc. are not ciphered because they do not have any corresponding PDCP SDUs or any set virtual PDCP SNs.

S15: The virtual PDCP SNs (i.e., the SNs set in step S11) corresponding to the respective header-compressed and ciphered PDCP SDUs are attached to the PDCP PDU headers to form PDCP PDUs. Namely, the virtual PDCP SNs (e.g., the SNs set in step S11) corresponding to the respective SDUs are attached to the PDCP PDU headers of the respective PDCP SDUs to form PDCP PDUs. Namely, when the PDCP PDUs are transferred to the RLC layer, the virtual PDCP SNs set in step S11 are explicitly attached to the respective SDUs. The step S15 is performed by a second setting module. In this case, because there is no virtual PDCP SN set for the feedback packet generated by the header compressor itself or the PDCP STATUS PDU generated by the PDCP layer itself, etc., the feedback packet or the PDCP STATUS PDU, etc., configure a PDCP PDU by itself without the PDCP SN. The PDCP layer transfers the thusly configured PDCP PDUs to the lower RLC layer.

S16: Upon receiving the RLC SDUs, namely, the PDCP PDUs, front the PDCP layer, the RLC layer stores them in the RLC SDU buffer. This is to flexibly support the PDU size of the RLC layer.

S17: The RLC layer stores the RLC SDUs in the SDU buffer, and when a lower MAC layer requests transmission of them at every transmission time, the RLC layer segments and/or concatenates the RLC SDUs as many as required according to the requested size. The step S17 is performed by a segmentation and concatenation module.

S18: The RLC layer sequentially attaches RLC SNs to the segmented and/or concatenated data blocks. In this case, the RLC layer may generate an RLC control PDU by itself irrespective of the RLD SDUs. The RLC SN-attached data blocks or the RLC SN-free RLC control PDU constitute RLC PDUs. The step S18 is performed by a third setting module.

S19: Because the AM RLC layer supports re-transmission, the AMC RLC layer stores the constructed RLC PDUs in an RLC PDU buffer. This is for a re-transmission that may be necessary afterwards.

The PDCP SNs in steps S11 and S15 and the RLC SN in step S18 have different properties as described above. Namely, the PDCP SNs are used for ciphering in the PDCP layer and eventually used for forwarding or re-transmitting only the PDCP data whose reception has not been confirmed by the receiving side. Meanwhile, the RLC SNs are used at the RLC layer and have a different purpose from that of the PDCP SNs. That is, in the present invention, when the SDUs are received by the PDCP layer from an upper layer, the PDCP SNs are attached to the SDUs, and when the PDCP SN-attached SDUs are transferred to the RLC layer, the RLC SNs are additionally attached thereto. The RLC SNs are not practically related to the PDCP SNs in view of usage.

The ciphering performed in the PDCP layer by using the PDCP SNs has been described with reference to FIG. 5. There are two types of data that is transferred from the PDCP layer to the RLC layer: the SN-added ciphered data; and the feedback packet which is not ciphered with SN and generated by the PDCP layer itself. When the transmitting side transmits the two types of data to the receiving side, the receiving side should discriminate a ciphered one and a non-ciphered one to deciphering the data. Thus, the present invention proposes a data structure having an indicator to discriminate them as shown in FIG. 6.

FIG. 6 is a view showing the data structure including indicators indicating whether data has been ciphered or not and a data processing method of the PDCP transmitting side.

The ciphering indicator in the data structure as shown in FIG. 6 exists ahead of the PDCP PDU header and informs whether the valid data part (payload) of the PDCP PDU has been ciphered or not. In this case, because the transmitting side PDCP layer ciphers the PDCP SDUs which have been received from an upper layer, by using the PDCP SNs, the transmitting side PDCP layer sets a value (which can be, for example, binary digit '1' if a field of the indicator is 1 bit) indicating that the PDCP SDUs have been ciphered, and in case of the packet generated by the PDCP itself, namely, the ROHC feedback packet or the like, because it is not ciphered, the transmitting side PDCP layer sets an another value (which can be, for example, binary digit '0' if the field of the indicator is 1 bit) indicating that the PDCP SDUs have not been ciphered. If there exists a control PDU that has been generated by the PDCP layer itself, the control PDU would not be ciphered, so the PDCP layer sets a value indicating that the control PDU has not been ciphered.

When the payload part is the PDCP SDU, the ciphering indicator indicates that the valid data (payload) part of the PDCP PDU has been ciphered. In this case, the presence of the PDCP SN used the ciphering informs not only that the payload part has been ciphered but also that the PDCP SN field exists.

This will be described with reference to FIG. 6.

As shown in FIG. 6, the sequential processes of S11 to S13 in FIG. 6 are the same as those of S11 to S13 in FIG. 5. Accordingly, the description for the processes of S11 to S13 is the same as that for the processes of FIG. 5.

The processes of S14' and S15' will now be described.

S14': The PDCP layer sequentially ciphers the header-compressed PDCP SDUs or the packets (ROHC feedback packets) generated by the PDCP layer itself, and adds the ciphering indicator indicating whether the data (i.e., the PDCP SDUs and the ROHC feedback packet) have been ciphered or not, to the header. Also, the PDCP layer may perform a security function by including an integrity protection function in addition to the ciphering of the PDCP SDUs. For the integrity, the PDCP layer integrity-protects the respective PDCP SDUs by using the virtual PDCP SNs. In this case, the ciphering indicator informs that the packets have been ciphered and integrity-protected. The packets generated by the PDCP layer itself, namely, the header compression feedback packets or the PDCP STATUS PDUs, etc. are not ciphered because they do not have corresponding, PDCP SDUs nor virtual set PDCP SNs, so the PDCP layer adds the ciphering indicator indicating that the corresponding packets have not been ciphered, to the headers of the packets.

S15': The virtual PDCP SNs corresponding to the respective header-compressed and ciphered PDCP SDUs are attached to the headers of the PDCP PDUs to form PDCP PDUs. Namely, when the PDCP PDUs are transferred to the RLC Layer, the virtual PDCP SNs are explicitly attached as PDCP SNs to the respective SDUs. The PDCP SNs are attached only to the case where the valid data (payload) part has been ciphered. Namely, the feedback packets or the PDCP STATUS PDUs, etc., generated by the header compressor itself are not ciphered, so the PDCP SNs are not added to the feedback packets or the PDCP STATUS PDUs, and the feedback packets or the PDCP STATUS PDUs form the PDCP PDU by themselves. The PDCP layer transfers the thusly configured PDCP PDUs to the lower RLC layer.

Meanwhile, the ciphering indicator may be added in the process of step S15', not the S14'. In this case, the PDCP layer should constantly recognize whether the valid data (payload) have been ciphered or not. If the valid data (payload) have been ciphered, the PDCP layer adds the ciphering indicators and the PDCP SNs to the headers of the PDCP PDUs. If the valid data (payload) have not been ciphered, the PDCP layer adds only the ciphering indicators to the headers to form the PDCP PDUs.

The structure of the data processed in the PDCP layer according to the present invention will now be described.

As shown in FIGS. 5 and 6, the data structure of the PDCP PDU includes an SDU which has been received from an upper layer (the SDU has undergone header compression) (or payload), an SN field added in from of the SDU and in which a PDCP SN is put, and an indicator added in front of the SN field and indicating whether or not the SDU has been ciphered. Meanwhile, as shown in FIG. 5, the RLC SN field in which the RLC SN is put is added in front of the PDCP SN field of the PDCP PDU transferred to the RLC layer.

The mobile communication transmitter according to the present invention as described with reference to FIGS. 5 and 6 will now be described.

The transmitter according to the present invention may be included in a terminal (or UE, device, etc.) and a transmitting device of a base station.

The transmitter according to the present invention performs the configuration and function as described with reference to FIGS. 5 and 6. Namely, the transmitter according to the present invention includes: 1) the first SN setting module that receives data (i.e., PDCP SDU) from an upper layer and sets a virtual SN associated with the data; 2) the first buffer (i.e., the PDCP SDU buffer) that stores the received data; 3) the header compression entity (e.g., the header compressor or an entity including the header compressor) that performs header compression on the received data (e.g., PDCP SDU); 4) the ciphering module that ciphers the header-compressed data; 5) the second SN setting module that adds a second SN to the ciphered data and transmits the same to the lower layer (i.e., the MAC layer). Here, the second SN setting module may be included as an element in the header compression entity. The elements 1) to 5) process the data of the PDCP layer.

In addition, the mobile communication transmitter according to the present invention includes, as elements for processing the data of the RLC layer, the second buffer that receives and stores the second SN-added data (i.e., the RLC PDU); the segmentation/concatenation module that segments and/or concatenates the data stored in the second buffer; the third SN setting module that adds a third SN to the segmented and/or concatenated data: and the third buffer that stores the third SN-added data (i.e., RLC PDU).

The PDCP layer applied to the present invention should support the RFC 2507 (IP Header Compression) and ROHC 3095 header compression protocol type.

Preferably, the RFC 3095 (ROHC) should be necessarily supported while the RFC 2507 may be additionally supported.

The invention being thus described, it will be obvious that the same may be varied many ways. Such variations are not to be regarded as a departure from the scope of the invention, and all such modifications as would be obvious to one skilled in the art are intended to be included within the scope of the following claims.

What is claimed is:
1. A transmitting device comprising:
a transceiver; and
a processor configured to:
  receive a packet data convergence protocol (PDCP) service data unit (SDU) from an upper entity and perform sequence numbering to the received PDCP SDU;
  compress a header of the received PDCP SDU;
  cipher the header-compressed PDCP SDU;
  add a first SN to the ciphered PDCP SDU, wherein the first SN is added to the ciphered PDCP SDU based on the sequence numbering;
  segment the first SN added PDCP SDU;
  add a corresponding second SN to each segment of the segmented PDCP SDU; and
  process the second SN added segmented PDCP SDU.
2. The transmitting device of claim 1, further comprising:
a first buffer configured to store the PDCP SDU received from the upper entity.
3. The transmitting device of claim 2, wherein the first SN-added PDCP SDU is a radio link control (RLC) SDU.
4. The transmitting device of claim 3, further comprising:
a second buffer configured to receive and store the RLC SDU.
5. The transmitting device of claim 1, wherein the processor is further configured to generate data independently from the PDCP SDU received from the upper entity.
6. The transmitting device of claim 5, wherein the generated data is a robust header compression (ROCH) feedback packet.
7. A method for processing data in a transmitting device, the method comprising:
receiving a packet data convergence protocol (PDCP) service data unit (SDU) from an upper entity;
performing sequence numbering to the received PDCP SDU;
compressing a header of the received PDCP SDU;
ciphering the header-compressed PDCP SDU;
adding a first SN to the ciphered PDCP SDU, wherein the first SN is added to the ciphered PDCP SDU based on the performed sequence numbering;
segmenting the first SN added PDCP SDU;
adding a corresponding second SN to each segment of the segmented PDCP SDU; and
processing the second SN added segmented PDCP SDU.
8. The method of claim 7, further comprising:
storing, in a first buffer, the PDCP SDU received from the upper entity.
9. The method of claim 8, wherein the first SN-added PDCP SDU is a radio link control (RLC) SDU.
10. The method of claim 9, further comprising:
receiving and storing, in a second buffer, the RLC SDU.
11. The method of claim 7, further comprising:
generating data independently from the PDCP SDU received from the upper entity.

12. The method of claim 11, wherein the data generated independently from the PDCP SDU received from the upper entity, is a robust header compression (ROCH) feedback packet.

* * * * *